June 17, 1958    E. M. FESSEL    2,838,986
SOD PERFORATING MACHINE
Filed July 11, 1955    3 Sheets-Sheet 1

INVENTOR.
EARL M. FESSEL
BY

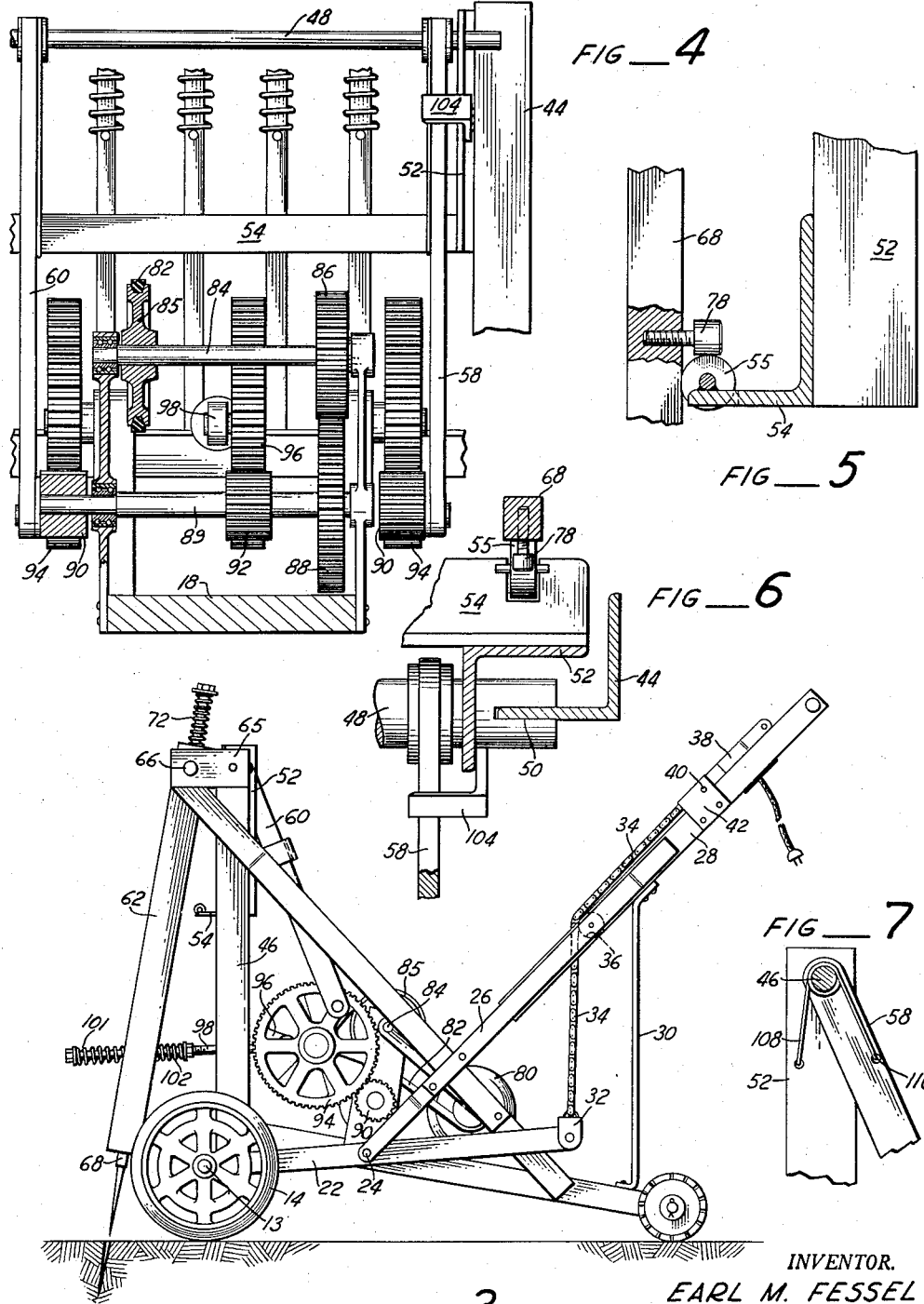

June 17, 1958    E. M. FESSEL    2,838,986
SOD PERFORATING MACHINE
Filed July 11, 1955    3 Sheets-Sheet 3
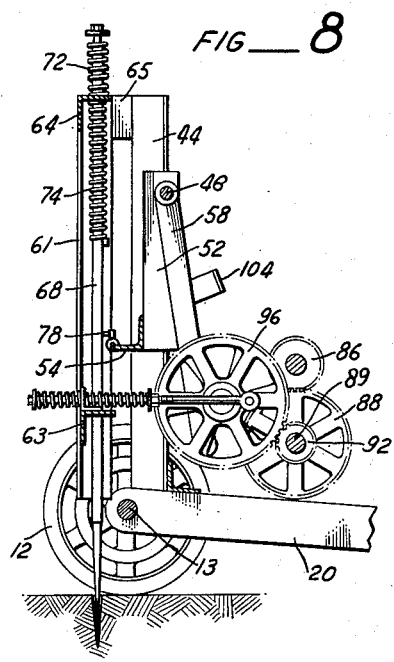
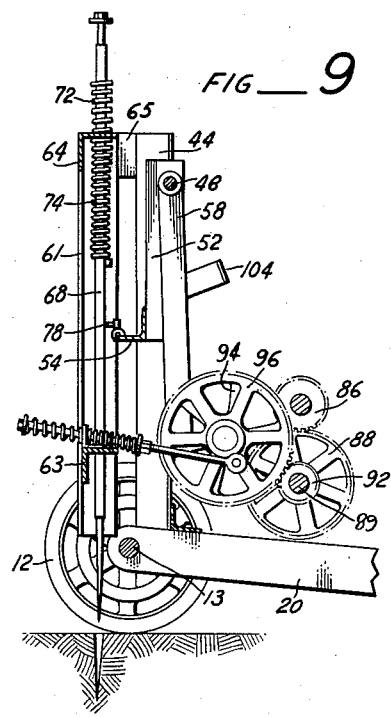
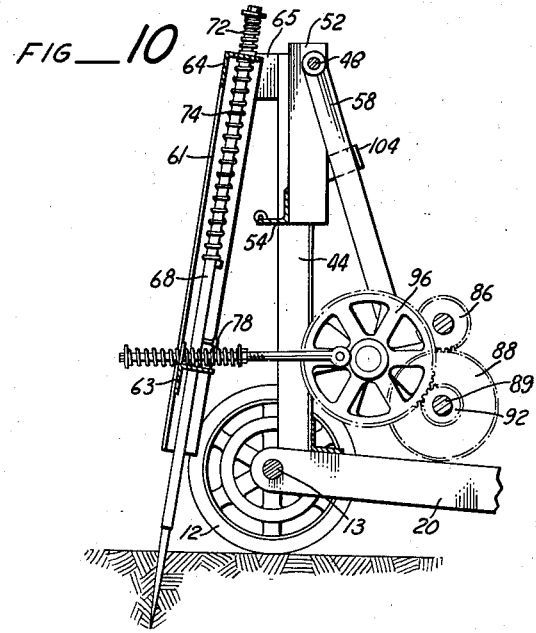
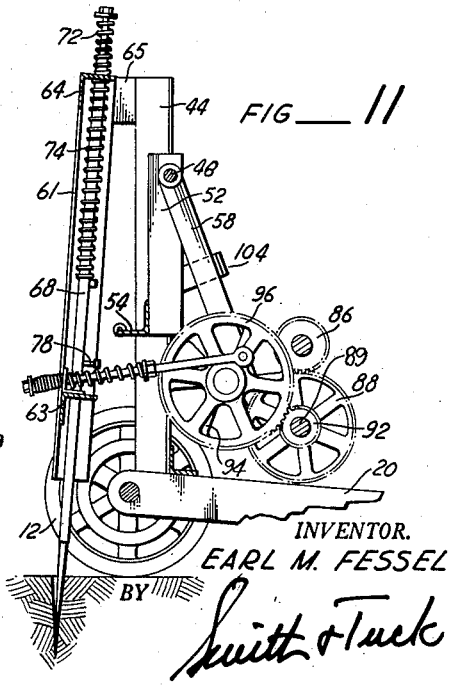
INVENTOR.
EARL M. FESSEL
BY
Smith &Tuck

United States Patent Office 2,838,986
Patented June 17, 1958

2,838,986

SOD PERFORATING MACHINE

Earl M. Fessel, Seattle, Wash.

Application July 11, 1955, Serial No. 521,008

6 Claims. (Cl. 97—36)

The present invention relates to new and useful improvements in a sod perforating machine and, more particularly, relates to a machine for dibbling and spiking the turf of lawns, parks, golf courses, and the like to provide aeration, to enhance water penetration, and to generally improve growing and maintenance conditions in such turf.

An important object of the present invention is to provide a sod perforating machine which includes a free-rolling carriage that supports a plurality of spikes for movement into and out of the ground in which locomotion of the carriage is obtained through pulling forces exerted upon the spikes when they are in the ground.

A further object of the invention has been the provision in a machine of the type described wherein the perforating spikes are caused to be rocked while in the ground to open elongated perforations which are larger than the perforating spike.

Still another object of the invention resides in the provision of a sod perforating machine wherein the ground piercing spikes are projected into the earth under the force of energy-storing means, but at that time are disconnected from the drive mechanism to such an extent that there is no positive mechanical coupling with the drive at the moment of entering the turf; hence, should resistance be encountered, the movement of the spike will be arrested without injury to it or to the rest of the machine, as would be the case with positively driven perforating spikes.

Another and further object of this invention has been to provide a sod perforating machine of the type described which is simple to construct, easy to operate, and which is movable over the ground in such a manner that no reliance is placed upon driven wheels or driven rollers, as appears to be conventional in the prior art.

These and other objects of my invention which will be more apparent during the course of the following specification are accomplished by the machine described and claimed herein. It is to be borne in mind that while specific apparatus and specific arrangements of parts have been adopted for the purposes of this disclosure, changes and alterations are contemplated. Such changes and alterations as fall within the scope and spirit of the subjoined claims, of course, are considered a part of the invention herein.

In the accompanying drawings, illustrating a preferred form of my invention, like characters are employed to designate like parts throughout the apparatus. The several views of the drawings show:

Figure 3 is a view in side elevation showing my lawn perforating machine as it appears for non-operating movement over the ground;

Figure 4 is an enlarged view in vertical elevation showing the power transmitting means employed in actuating the perforating spikes of my machine, portions being omitted or shown in section for convenience of illustration;

Figure 5 is an enlarged detail view of the spike raising apparatus employed in my perforating machine;

Figure 6 is an enlarged detail plan view of the mechanism of Figure 5;

Figure 7 is a fragmentary enlarged detail view of another portion of the spike raising mechanism, and Figures 8, 9, 10 and 11 are fragmentary vertical section views through the machine detailing four positions of the elements assumed during a single cycle of operation of the machine.

Free-rolling carriage

Figure 1:
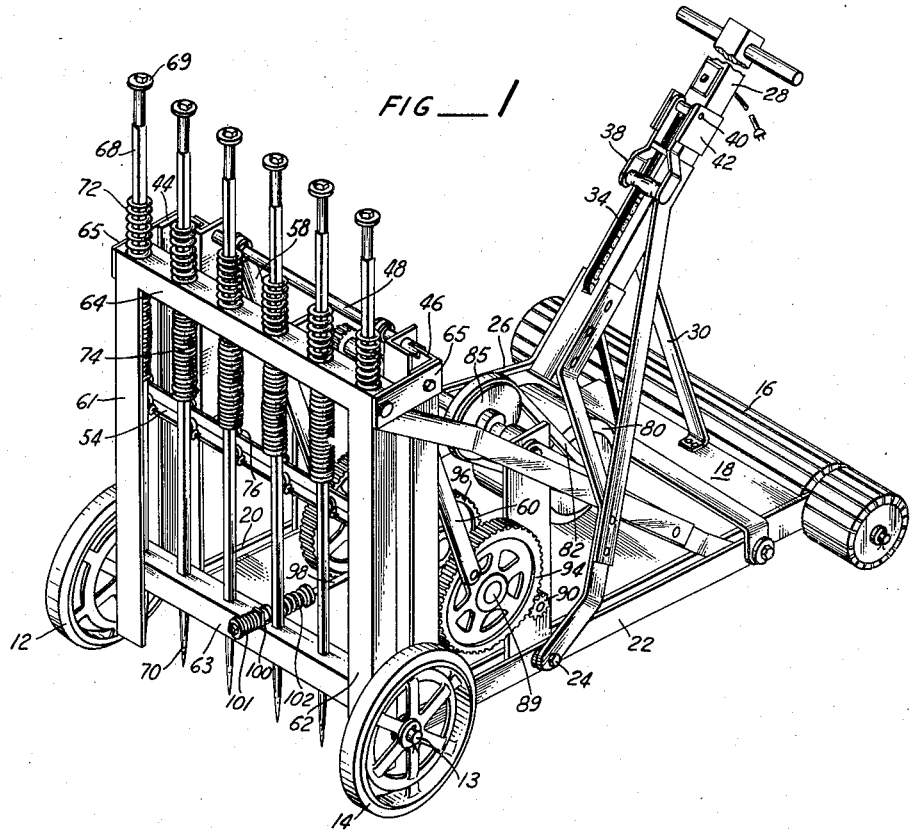
Figure 1 is a perspective view of my sod perforating machine.
Figure 2:
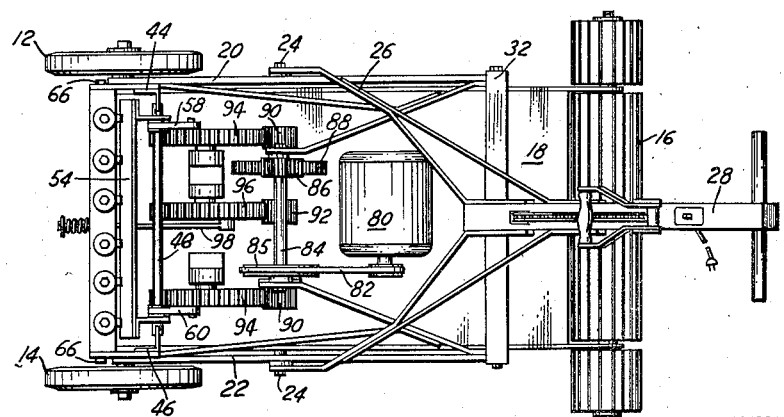
Figure 2 is a reduced scale plan view of the machine shown in Figure 1.

The base upon which my sod perforating machine is mounted comprises a free-rolling carriage that includes the front wheels 12 and 14 and the rear roller 16, the axles of which support platform 18. Pivotally engaged on the axle 13 of wheels 12, 14 and extending rearwardly therefrom is a pair of parallel links 20, 22 that lie alongside the side edges of the platform 18. These links are pivoted to platform 18 by bolts 24 medial of the ends of links 20, 22 and engaging the platform somewhat rearward of its front edge. A handle yoke 26 is also secured to the platform by bolts 24 and supports handle 28 which extends rearward from the wheel attachment and over the rear roller 16. Brace 30 stiffens the handle 28 with respect to the rear part of platform 18. The yoke 32 extends between the rear ends of links 20, 22 and a flexible chain 34 rises therefrom, passing through the handle and over roller 36 to attach to the toggle handle 38 pivotally mounted at 40 in a pair of cheek plates 42 carried by the handle 28.

From the foregoing it will be seen that the free-rolling carriage comprises an articulated platform, the main portion 18 of which is forwardly free of the wheels 12 and 14 except through the cooperative relationship established by links 20, 22. When the toggle handle 38 is in the upper position shown in Figure 3 and the rear ends of the links 20, 22 are raised, medial pivot 24 is likewise raised. The result is that the forward end of the platform 18 is raised from the ground, all for a purpose later to be described. By swinging the handle 38 from the position of Figure 3 to the downward position shown in Figure 1, the front of the machine is lowered.

Erect guide frame

A guide frame, including angle iron guide posts 44 and 46, is rigidly erected at the front of platform 18. Cross shaft 48, laterally slotted at 50, is located between opposed webs of posts 44, 46 and slides vertically thereon. An arm 52 hangs from each end of shaft 48 to close to and in slight overlapping relation with the posts 44 and 46. The lower ends of the arms 52 are connected by a sear bar 54, as shown in Figures 4, 5 and 6, which extends across the machine. Actuator links 58 and 60 likewise extend from shaft 48 at each end at a downward and slightly rearward inclination.

Spike frame

A rectangular spike frame, including upright side members 61 and 62, lower cross member 63 and the upper cross member 64, is disposed in front of the guide frame. Forwardly extending ears 65, rigid on the upper portions of posts 44 and 46, receive pivot pins 66 and provide a means of supporting the spike frame for swinging movement of the spike frame to a position of forward inclination relative the guide frame.

Perforating spikes

A plurality of elongated bars 68, slidably mounted in aligned openings in the cross members 63 and 64 of the spike frame, comprise a gang of sod spiking or perforating elements. Each bar has a head 69 on its upper end and the lower end 70 is sharply pointed. A shock absorbing spring 72 is interposed between each head 69 and the upper surface of the cross bar 64. An energy-storing spring 74 encircles each spike 68 beneath bar 64 and is disposed between a stop pin 76 on the spike and the under surface of the cross member 64 of the spike frame. The spikes move in an upright reciprocating manner in the spike frame and are caused to do so through the coaction of rollers 55 on the sear bar 54 and abutment pins 78 on the individual spikes.

It will be understood that the sear bar 54 moves vertically up and down, and in doing so raises the gang of spikes 68 simultaneously. Disengagement of rollers 55 and pins 78 permit forcible projection of spikes 68 downward under the action of springs 74.

Power means

The mechanism of my sod perforating machine is actuated by motor 80 mounted on platform 18 which, through a drive belt 82 and sheave 85, rotates the upper countershaft 84 having spur gear 86 thereon. Gear 86 meshes with gear 88 on lower countershaft 89 which has spur gears 90, 90 at its ends and intermediate spur gear 92. Crank gears 94, 94 each engage a spur gear 90. Push-pull crank gear 96 meshes with gear 92. Link arms 58 and 60 are each connected to a crank gear 94.

Rotation of the gears 94 results in the link arms 58 and 60 rising and descending and, in turn, produces vertical reciprocation of the cross shaft 48. The depending arms 52 and the sear bar 54 are thus likewise caused to reciprocate and in so doing to raise the perforating spikes.

Push-pull mechanism

By means of gear 86, on countershaft 84, meshed with gear 88 on the lower countershaft 89, I drive gear 92 and gear 96 meshed therewith. A push-pull link 98 is coupled off-center of gear 96 in the manner of a crank and is thus caused to reciprocate.

As shown in Figure 1, push-pull link 98 is operatively secured to cross member 63 of the spike frame by passing through clip 100, on each side of which are spring 101 and 102 suitably seated against washers secured to link 98. Rotation of gear 96, through its association with the push-pull link, results in the spike frame being swung from an upright position adjacent the erect frame to a position of forward inclination relative thereto during each revolution of the gear 96. Likewise revolution of the gears 94 results in rising and lowering motion of the sear bar 54 once each revolution of the gear.

Sequence of operation

The connections of the links 58, 60 to gears 94 and the connection of the push-pull link 98 to gear 96 are so arranged relative their respective axes that, when the spikes 68 are withdrawn from the ground, the push-pull link operates to swing the spike frame toward the position of forward inclination at about the moment that the spikes are reaching the upper limit in their path of reciprocal travel in the spike frame. At such point the shoulder pins 78 on the spikes 68 are dislodged from rollers 55 on the sear bar 54, whereupon the spikes are free to descend under the effect of the energy which has been stored in springs 74 due to the fact that they have been compressed. This causes the spikes to be driven forcibly into the ground at a position somewhat in advance of the forward end of the free rolling carriage and, particularly, of its wheels 12 and 14. This position is shown in Figure 10.

The driving of the spikes into the ground results in their being anchored so that continued rotation of the gear 96, as shown in Figure 11, causes a pull to be exerted on the carriage to produce forward locomotion thereof. In so doing, the spikes are rocked in the ground, or twisted, which is an action that tends to enlarge the hole of perforation that has been formed. Thus, the machine assumes the position shown in Figure 8 in which the spikes are practically vertical. At about this time the sear bar 54 engages the shoulders 78 of the gang of spikes and commences to raise them, as has been described. Raising continues from the position shown in Figure 8 to that shown in Figure 9, whereupon the energy storing spring 74 are practically fully compressed. The push-pull link then becomes effective to shove the spike frame forward and to again dislodge or disengage the shoulders on the spikes from the rollers on the sear bar for another perforation of the ground.

Since the arms 52 and the sear bar 54 are practically free hanging, it is advisable to facilitate the dislodgment or disengagement of the sear bar from the shoulders on the spike through the function of the hook arm 104 through its engagement with links 58, 60 as the same passes over the point of upper dead-center in the path of travel of its lower pivotal connection with the gear 94. This action is to slightly tilt the sear bar rearward and to draw it from beneath the abutment pins 78 of the spikes. The ends 108 and 110 of the cross-legged hairpin spring, as shown in Figure 7, engage legs 52 and links 58, 60 to urge the sear bar 54 forward.

The provision of the articulated platform 18 of my free-rolling machine carriage is advantageous because it permits the movement of the machine over the ground with the spikes raised so that even in their most downward extended position their points do not contact the ground. This is as shown in Figure 3. At the same time, however, the operator has, right at the handle, the means (i. e., toggle handle 38, the connecting strand 34 and the yoke 32) whereby the jointed platform may be collapsed to immediately lower the spikes to operating contact with the ground. Through this arrangement another advantage is obtained. Occasions will arise where an operator wishes to leave his machine unattended on a hillside. Since the machine is free-rolling, if it were to be left with the spikes out of the ground, it is obvious that gravity could take effect and the machine run away. This is easily avoided by leaving the machine with the platform 18 in the lower operating position and with the points 70 of the spikes driven in the ground. If a machine were to roll away while the operator left it unattended, it is possible that, if he were perforating an area of lawn, he would have difficulty in returning it to the pattern that he had adopted. The anchoring of the machine in place, of course, avoids such a happening.

It should be apparent from the foregoing description of the machine and its operation that in my lawn and sod perforating device locomotion is obtained through the instrumentality of the spikes. This machine is to be distinguished from those which are moved over the ground through the use of driven wheels or driven rollers. A very definite and important advantage flows from my means of locomotion. In the first place, the free-rolling arrangement of the carriage permits it to be manually moved with spikes up by an operator walking and pushing or pulling it. Alternatively, the machine may be attached to a tractor and dragged to its particular position. In addition, locomotion obtained by the spikes being driven in the ground and the carriage being drawn toward the spikes, permits this machine to operate uphill or downhill very effectively and in a manner superior to those machines having driven wheels or rollers. It often happens that a spiking or perforating operation is best performed when the ground is wet, as following a rain or a heavy sprinkling. Under such conditions, the grass or soil is slippery and the machine can skid or slide out of position or be unable to moved forward at all. When driven wheels or rollers slip or slide, unsightly scars and damage to the grass can result. With my machine this does not happen since the machine moves forwardly over the ground as the carriage is hitched toward the anchored spike through the operation of the push-pull linkage mechanism. By the application of suitable motive power, and this can include a gas engine as well as the electric motor shown, my sod perforating machine will climb quite steep banks, such as are encountered on golf courses or in hilly parks. This is desirable to the grounds keeper because it often occurs that hilly, sloping surfaces lie fully exposed to the sun and are baked to a condition of hardness that perforating would aid and improve considerably, but which it is impractical to perforate with dibbling machines of prior art developments of which I am aware for the reason stated.

The manner in which the spikes 68 are mounted in the spike frame is such that the gang of spikes is easy to assemble and disassemble, as for sharpening of the spikes or for their replacement. The spikes likewise are easy to make, being simple rods that merely slide in the spike frame. The operation of the spikes is important in that they are projected much in the manner of a lance. This means that they are free, within the limits permitted in the spike frame, to be projected into the ground, but in the event that they should strike a rock or other solid object, they can stop short of ultimate penetration without mechanical damage to themselves or to the operating mechanism of the machine. In this respect I have in mind the difference between my arrangement of raising and cocking the spikes and then releasing them as compared with dibbling machines in which the spike is mechanically joined to a wheel or arm that has no resilience and requires either that the spike penetrate the ground or some part break or be strained.

Further, through the use of the spike as an important element of locomotion means in my sod perforating device, in the preferred form shown herein, the spikes are caused to rock when they are anchored in the ground. Thus they dibble the ground to open up wedge-shaped perforations, as distinguished from perforations formed by dibbling spikes that merely go in and then come out of the ground in straight-line motion.

It will likewise be apparent that the application of power in my machine is very simple and effective and is in such a manner, with respect to the spikes, that it is only necessary to raise the spikes against the resistance provided by the energy-storing springs 74. This means that the maximum load placed upon the motor or engine and the train of drive gears is measured by the resistance of the springs. To put it another way, back pressures that might be caused through meeting resistance, as in the case of positively driven spikes of the prior art constructions, is avoided. Also, it will be noted that the elements of the drive mechanism, while fully exposed, in the event that no cover is placed over them, may be easily shielded or concealed to prevent foreign objects from accidently getting between the teeth of the gears or into the working parts.

It cannot be overlooked that by substituting pads on the ends of the pins 68 my machine can be readily used as a tamping machine, as when new lawns are to be made, low spots filled, or high spots lowered, and that the degree of applied tamping force can be governed by the strength of the springs 74 used in the machine. Alternatively, shoulders may be added to the spikes, spaced from their points 70, so that simultaneous perforating and spiking can be obtained.

Having thus described my invention, I claim:

1. A sod perforating machine, comprising: a rollable carriage, an erect frame pivotally mounted forwardly on said carriage to swing from a substantially vertical position to a position of forward inclination, a gang of spikes slidably mounted in said frame and including energy storing means to normally bias the spikes downwardly, each said spike having a shoulder thereon, a vertically movable means including sear means to engage the shoulder on each spike to simultaneously raise said gang of spikes in said frame and to accumulate energy in said energy storing means, push-pull link means operable between said carriage and said frame to swing said frame and the raised spikes into the position of forward inclination and to dislodge said spike shoulders from said sear means to release the spikes for operation thereon of the energy storing means to forcibly drive the spikes into the sod, said pushpull link means thereafter being operable to advance said carriage over the ground and thereby re-erect said frame, and motive means on said carriage to actuate said vertically movable means and to reciprocate said push-pull link means in timed relation as recited.

2. A sod perforating machine comprising: a rollable carriage, an upright guide frame rigidly mounted forwardly of said carriage, an erect frame pivotally mounted at an upper axis on said rigid frame to swing from a substantially vertical position to a position of forward inclination, a gang of spikes slidably mounted in said erect frame and including energy storing means to normally bias the spikes downwardly, each said spike having a shoulder thereon, vertically movable means guidedly associated with said guide frame and including sear means to engage the shoulder on each spike to simultaneously raise said gang of spikes in said erect frame and to accumulate energy in said energy storing means, push-pull link means operable between said carriage and said frame to swing said frame and the raised spikes into the position of forward inclination and to dislodge said shoulders from said sear means to release the spikes for operation thereon of the energy storing means to forcibly drive the spikes into the sod, said push-pull link means thereafter being operable to advance said carriage over the ground and thereby re-erect said erect frame, and motive means on said carriage to actuate said vertically movable means and to reciprocate said push-pull link means in timed relation as recited.

3. A sod perforating machine, comprising: a free rolling carriage, a gang of reciprocal spikes on said carriage mounted for swinging motion from a substantially upright position to a position of forward inclination, means to raise said gang of spikes, a driven crank on said carriage, link means between said crank and said gang of spikes to swing the latter forwardly of said carriage, and spring means to drive said spikes into the sod to thereby anchor the same, said crank and link means operable between said carriage and said anchored gang of spikes to draw said carriage forward over the sod.

4. A sod perforating machine, comprising: a free rolling carriage, reciprocal spike means on said carriage mounted for swinging movement from a substantially upright position to a position of forward inclination, said spike means having overhanging shoulder means thereon, vertically movable sear means engageable under said shoulder means to raise said spike means, means for vertically moving said sear means, means to swing said spike means forward inclination relative to said carriage to thereby disengage said shoulder means from said sear means, means to drive said spike means into the sod to anchor the same, and means operable between said carriage and said spike means when anchored to draw said carriage over the sod.

5. The structure according to claim 1 in which there is a crank mechanism associated with said motive means and with said push-pull link means to reciprocate the same.

6. A sod perforating machine, comprising: a free rolling carriage, a spike frame supported by said carriage for periodic disposition in advance thereof, spike means vertically reciprocal in said spike frame, means for vertically reciprocating said spike means to drive the same into the earth and to withdraw the same therefrom, a crank on said carriage link means between said crank and frame for moving said spike frame relative to said carriage and operable to advance the spike frame ahead of said carriage while said spike means are withdrawn from the earth and raised in said frame, said crank and link means for moving said spike frame also being operable to draw said carriage toward said frame while said spike means is penetrating the earth.

References Cited in the file of this patent

UNITED STATES PATENTS

| | | |
|---|---|---|
| 2,056,337 | Archibald | Oct. 6, 1936 |
| 2,068,828 | Tustain | Jan. 26, 1937 |
| 2,302,944 | Helbig | Nov. 24, 1942 |
| 2,641,982 | Harshberger | June 16, 1953 |